(12) United States Patent
Keyser et al.

(10) Patent No.: US 9,272,684 B1
(45) Date of Patent: Mar. 1, 2016

(54) MULTI-CHAMBER AIRBAG WITH PINCH VALVE

(71) Applicant: Autoliv ASP, Inc., Ogden, UT (US)

(72) Inventors: David Keyser, Orion, MI (US); Donald Paxton, Romeo, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/512,025

(22) Filed: Oct. 10, 2014

(51) Int. Cl.
- *B60R 21/233* (2006.01)
- *B60R 21/205* (2011.01)
- *B60R 21/237* (2006.01)
- *B60R 21/231* (2011.01)
- *B60R 21/00* (2006.01)

(52) U.S. Cl.
CPC ............. *B60R 21/233* (2013.01); *B60R 21/205* (2013.01); *B60R 21/231* (2013.01); *B60R 21/237* (2013.01); *B60R 2021/0004* (2013.01); *B60R 2021/0009* (2013.01); *B60R 2021/0048* (2013.01); *B60R 2021/23107* (2013.01)

(58) Field of Classification Search
CPC ...................................................... B60R 21/233
See application file for complete search history.

(56) References Cited

U.S. PATENT DOCUMENTS

| | | | |
|---|---|---|---|
| 3,614,129 A | 10/1971 | Sobkow | |
| 3,642,303 A | 2/1972 | Irish et al. | |
| 3,768,830 A | 10/1973 | Hass | |
| 3,801,126 A | 4/1974 | Knight, IV et al. | |
| 4,043,572 A | 8/1977 | Hattori et al. | |
| 4,262,931 A * | 4/1981 | Strasser et al. | 280/729 |
| 5,556,128 A | 9/1996 | Sinnhuber | |
| 5,575,497 A | 11/1996 | Suyama | |
| 5,586,782 A | 12/1996 | Zimmerman, II | |
| 5,609,363 A | 3/1997 | Finelli | |
| 5,791,685 A | 8/1998 | Lachat et al. | |
| 5,803,485 A | 9/1998 | Acker et al. | |
| 5,853,191 A | 12/1998 | Lachat et al. | |

(Continued)

FOREIGN PATENT DOCUMENTS

| | | |
|---|---|---|
| DE | 10146493 A1 | 4/2003 |
| DE | 102010019592 A1 * | 11/2011 |

(Continued)

OTHER PUBLICATIONS

Office Action mailed Dec. 5, 2014, in U.S. Appl. No. 14/099,928, filed Dec. 7, 2013.

(Continued)

*Primary Examiner* — Nicole Verley
(74) *Attorney, Agent, or Firm* — Stoel Rives LLP

(57) ABSTRACT

An airbag can include a first cushion portion that defines a first inflatable chamber and a second cushion portion that defines a second inflatable chamber. An inflator generates inflation gas to inflate the inflatable chambers. The first inflatable chamber is in fluid communication with the inflator to receive inflation gas to expand the first cushion portion. The second inflatable chamber is in fluid communication with a fill tube or other conduit, which is in fluid communication with the inflator to receive inflation gas to expand the second cushion portion. The fill tube is configured to be disposed between a portion of the first cushion portion and a portion of a vehicle, such that expansion of the first cushion portion as the first inflatable chamber inflates causes the fill tube to be closed. The fill tube is pinched closed against the vehicle portion by expansion of the first cushion portion.

17 Claims, 9 Drawing Sheets

(56) References Cited

U.S. PATENT DOCUMENTS

| | | | |
|---|---|---|---|
| 5,945,184 A | 8/1999 | Nagata | |
| 6,123,355 A | 9/2000 | Sutherland | |
| 6,126,196 A | 10/2000 | Zimmerman | |
| 6,135,493 A | 10/2000 | Jost et al. | |
| 6,139,052 A | 10/2000 | Preamprasitchai | |
| 6,158,765 A | 12/2000 | Sinnhuber et al. | |
| 6,196,575 B1 | 3/2001 | Ellerbrok et al. | |
| 6,247,727 B1 | 6/2001 | Hamada | |
| 6,254,121 B1 | 7/2001 | Fowler et al. | |
| 6,308,983 B1 | 10/2001 | Sinnhuber | |
| 6,419,262 B1 | 7/2002 | Fendt et al. | |
| 6,431,586 B1 * | 8/2002 | Eyrainer et al. | 280/730.1 |
| 6,648,371 B2 | 11/2003 | Vendely | |
| 6,786,505 B2 * | 9/2004 | Yoshida | 280/729 |
| 6,971,664 B2 | 12/2005 | Amamori et al. | |
| 7,040,650 B2 | 5/2006 | Neupert et al. | |
| 7,261,320 B2 | 8/2007 | Fredin et al. | |
| 7,347,450 B2 | 3/2008 | Williams et al. | |
| 7,571,929 B2 * | 8/2009 | Fukawatase et al. | 280/730.1 |
| 7,726,685 B2 * | 6/2010 | Abe et al. | 280/736 |
| 7,850,200 B2 | 12/2010 | Zauritz et al. | |
| 7,938,445 B2 | 5/2011 | Smith et al. | |
| 7,942,443 B2 | 5/2011 | Dennis et al. | |
| 7,988,188 B2 | 8/2011 | Zauritz et al. | |
| 8,186,713 B2 | 5/2012 | Fischer et al. | |
| 8,215,665 B2 * | 7/2012 | Ohara et al. | 280/729 |
| 8,596,678 B2 * | 12/2013 | Ravenberg et al. | 280/736 |
| 2003/0094794 A1 | 5/2003 | Amamori | |
| 2003/0193174 A1 | 10/2003 | Abe | |
| 2003/0209895 A1 | 11/2003 | Gu | |
| 2003/0218325 A1 | 11/2003 | Hasebe et al. | |
| 2004/0046369 A1 | 3/2004 | Michael et al. | |
| 2004/0090054 A1 | 5/2004 | Bossecker et al. | |
| 2004/0145161 A1 | 7/2004 | Hasebe et al. | |
| 2005/0029781 A1 | 2/2005 | Enders et al. | |
| 2005/0104339 A1 | 5/2005 | Hasebe et al. | |
| 2005/0110249 A1 | 5/2005 | Hasebe | |
| 2005/0184489 A1 | 8/2005 | Kobayashi | |
| 2005/0269808 A1 | 12/2005 | Song et al. | |
| 2006/0006631 A1 | 1/2006 | Meissner et al. | |
| 2006/0175809 A1 | 8/2006 | Yamaji et al. | |
| 2006/0197324 A1 | 9/2006 | Klinkenberger | |
| 2006/0232050 A1 | 10/2006 | Kumagai et al. | |
| 2006/0284400 A1 | 12/2006 | Sakakibara et al. | |
| 2006/0290111 A1 | 12/2006 | Kokeguchi | |
| 2007/0126217 A1 | 6/2007 | Nayef | |
| 2007/0170710 A1 | 7/2007 | Bouquier | |
| 2007/0210565 A1 | 9/2007 | Song et al. | |
| 2008/0048420 A1 * | 2/2008 | Washino | 280/731 |
| 2008/0054602 A1 | 3/2008 | Yang | |
| 2008/0073893 A1 | 3/2008 | Schneider | |
| 2008/0100041 A1 | 5/2008 | Kim et al. | |
| 2008/0143086 A1 | 6/2008 | Higuchi | |
| 2008/0179867 A1 | 7/2008 | Riedel et al. | |
| 2008/0308338 A1 | 12/2008 | Kitte et al. | |
| 2009/0020987 A1 | 1/2009 | Wipasuramonton | |
| 2009/0026743 A1 * | 1/2009 | Arez | 280/740 |
| 2009/0121462 A1 | 5/2009 | Rick | |
| 2009/0189374 A1 | 7/2009 | Fukawatase | |
| 2010/0066064 A1 | 3/2010 | Kotikovsky | |
| 2010/0252350 A1 | 10/2010 | Hayashi et al. | |
| 2011/0101660 A1 | 5/2011 | Schneider et al. | |
| 2011/0140398 A1 | 6/2011 | Song et al. | |
| 2012/0025497 A1 | 2/2012 | Yoo | |
| 2012/0200069 A1 | 8/2012 | Kato et al. | |
| 2012/0223550 A1 | 9/2012 | Mazanek | |
| 2013/0001935 A1 | 1/2013 | Nagasawa et al. | |
| 2013/0087995 A1 | 4/2013 | Lee et al. | |
| 2014/0265271 A1 | 9/2014 | Dinsdale et al. | |
| 2014/0375032 A1 * | 12/2014 | Fukawatase et al. | 280/729 |
| 2015/0158452 A1 | 6/2015 | Choi et al. | |
| 2015/0166002 A1 * | 6/2015 | Fukawatase | B60R 21/205 |
| 2015/0175116 A1 * | 6/2015 | Cho et al. | B60R 21/233 |

FOREIGN PATENT DOCUMENTS

| | | |
|---|---|---|
| DE | 102012019581 A1 * | 4/2013 |
| EP | 2617607 A1 | 7/2013 |
| JP | 06024283 | 2/1994 |

OTHER PUBLICATIONS

Office Action mailed Jan. 9, 2015, in U.S. Appl. No. 14/294,405, filed Jun. 3, 2014.

Office Action mailed May 21, 2015, in U.S. Appl. No. 14/099,928, filed Dec. 7, 2013.

International Search Report and Written Opinion for PCT/US2014/067283 mailed Feb. 20, 2015.

Office Action mailed Sep. 4, 2015, in U.S. Appl. No. 14/258,853, filed Apr. 22, 2014.

Office Action mailed Jun. 25, 2015, in U.S. Appl. No. 14/294,405, filed Jun. 3, 2014.

International Search Report and Written Opinion for PCT/US2015/019716 mailed Jun. 3, 2015.

International Search Report and Written Opinion for PCT/US2015/029615 mailed Sep. 23, 2015.

* cited by examiner

MULTI-CHAMBER AIRBAG WITH PINCH VALVE

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
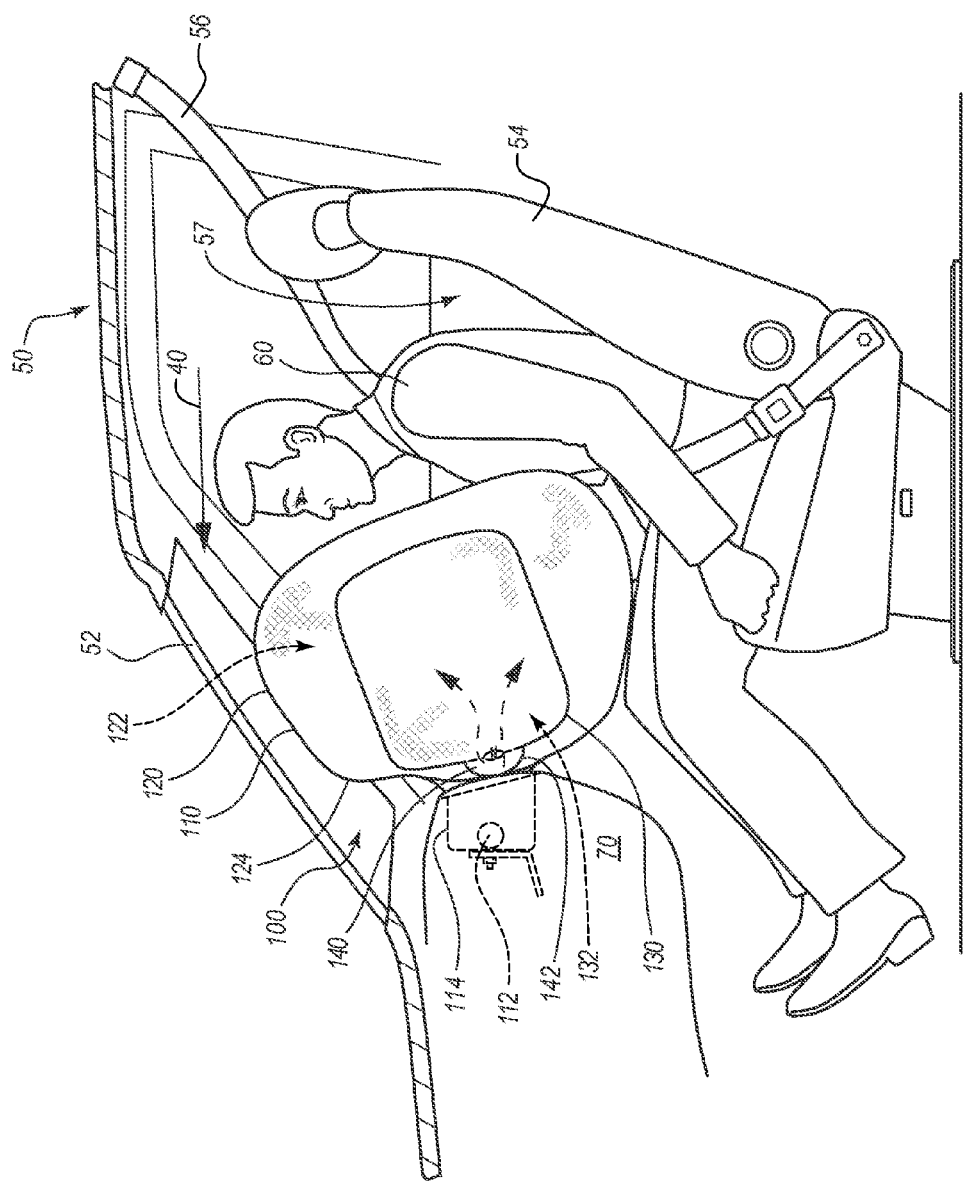
FIG. 1A is a side elevation view of an airbag assembly, according to one embodiment of the present disclosure, in a deployed state within a vehicle. The airbag assembly includes a multi-chambered airbag with a supplemental cushion attached to a primary cushion. A fill tube extending from the primary cushion to the supplemental cushion is open. The vehicle occupant is depicted moving toward the deployed airbag assembly in a direction of travel of the vehicle.

As will be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes an airbag comprising multiple portions (e.g., cushions, chambers, regions, sections, or pieces) that are configured to cushion an occupant during a collision event. A first or primary cushion portion can be configured to deploy primarily toward a vehicle occupant position (e.g., the position typically occupied by a passenger). This primary cushion portion may be configured to receive the torso and/or the head of a passenger in a frontal collision event. A second or supplemental cushion portion may be configured to deploy primarily in a different direction, such as, for example, in an inboard direction. For example, the supplemental cushion portion may be configured to deploy primarily in a direction that is lateral, transverse, or perpendicular to the direction in which the first cushion portion deploys. The supplemental cushion portion may be particularly suited for cushioning the head of a vehicle occupant when the occupant moves in an oblique direction relative to a direction of travel of the vehicle.

Airbags that have multiple cushion portions (e.g., multi-chamber airbags) may provide increased protection to a passenger, as compared with certain airbags that have only a single inflatable portion. For example, in some embodiments, the first (e.g., primary) cushion portion may be configured to receive a vehicle occupant in a frontal collision event that causes the vehicle occupant to move primarily directly forward, as previously stated, and/or primarily in a direction of travel. The second (e.g., supplemental) cushion portion may be configured to stabilize the first cushion portion relative to the dashboard and/or receive the passenger when the vehicle is involved in a collision that causes the vehicle occupant to move in both a forward direction and an inboard direction (e.g., oblique to the direction of travel). For example, in some instances a single-chamber airbag may be too narrow to provide effective coverage for a vehicle occupant who has a forward and inboard trajectory (which may also be referred to as an angled or oblique trajectory). In some instances, a vehicle occupant may slide off of the single-chamber airbag cushion during loading of the airbag when the occupant has a forward and inboard trajectory, or the occupant may entirely fail to engage with the cushion. An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is travelling in a direction that is not substantially parallel to the other vehicle's direction of travel; co-linear vehicle-to-vehicle collisions, such as collisions where, immediately prior to impact, both vehicles are travelling in substantially parallel directions; or collisions with a stationary object.

Some embodiments disclosed herein can provide improved positioning, cushioning, and/or safety to occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012).

In some embodiments, a first cushion portion may deploy or begin deployment before the second cushion portion begins to be deployed. The second cushion portion can be configured to receive gas via a fill tube that fluidly couples the first and second cushion portions. Advantages of various embodiments will be evident from the present disclosure.

FIG. 1A is a side elevation view of an instrument panel 70 and an airbag assembly 100 within a vehicle 50. The instrument panel 70 may also be referred to herein as a dashboard. In many vehicles 50, a central region of the instrument panel 70 can include a stack of various buttons, controls, and other user interfaces. For example, the central region, which may commonly be referred to as a center stack or as an IP stack region 71 (see FIG. 2A), can include one or more of a screen (such as for navigation, backup camera display, etc.), radio and/or other media controls, climate controls, etc. The airbag assembly 100 is depicted in a deployed and inflated configuration. A vehicle occupant 60 is shown seated in a front passenger seat 54 of the vehicle 50. When the airbag assembly 100 is not deployed, the airbag assembly 100 may be positioned within the instrument panel 70. As shown in FIG. 1A, an occupant restraint system can include the airbag assembly 100 and any other suitable restraint devices, such as a seatbelt 56.

The airbag assembly 100 can include an inflatable airbag cushion 110 (which may also be referred to as an airbag), an inflator 112, and an airbag housing 114. The airbag housing 114 may be of any suitable variety, and may include a cover (not shown), behind which the airbag cushion 110 is located. The cover may be of any suitable variety, and may include a tear seam or burst seam through which the airbag cushion 110 may deploy. The housing 114 can be mounted within the dashboard 70 in any suitable manner.

The airbag 110 may be manufactured in any suitable manner, such as via one-piece weaving, "cut and sew" techniques, or a combination thereof. In some embodiments, separate panels may be joined together using sealed or unsealed seams, wherein the seams are formed by stitching, adhesive, taping, radio frequency welding, heat sealing, and/or any other suitable technique or combination of techniques.

In the illustrated embodiment, the inflatable airbag cushion 110 includes a first, or primary, cushion portion 120; a second, or supplemental, cushion portion 130; and a fill tube 140 to direct inflation gas into the second cushion portion 130.

The first cushion portion 120 can comprise any suitable shape. For example, in some embodiments, the first cushion portion 120 comprises any suitable passenger airbag configuration. In some embodiments, the first cushion portion 120 is formed of any suitable arrangement of panels. The panels may comprise separate pieces of material that are joined along seams or may be formed of a unitary piece of material. For example, the first cushion portion 120 may include a side panel adjacent to a side door of the vehicle 50, an oppositely positioned side panel facing the interior of the vehicle 50, and one or more panels that connect the side panels to each other to at least substantially enclose and/or define a first inflatable chamber 122. The one or more panels may include a front panel disposed toward a front of the vehicle 50. The front panel may include or couple to a throat configured to couple to and receive inflation gas from the inflator 112. The first cushion portion 120 may also be referred to as a primary cushion, a primary cushion portion, or a primary chamber.

The second cushion portion 130 can define a smaller volume than the first cushion portion 120, and may also be referred to as a supplemental cushion or a supplemental chamber. The second cushion portion 130 can comprise any suitable shape and configuration, and may be formed in any suitable manner. For example, the second cushion portion 130 may likewise comprise a plurality of panels that are joined together along their edges. The panels may be formed of separate pieces of material or from a single piece of material.

The second cushion portion 130 may be joined to the first cushion portion 120 in any suitable manner, such as via one or more seams (e.g., one or more lines of stitching, welds, and/or adhesives). In some embodiments, a seam (such as a perimeter seam) that is used to join a side panel of the first cushion portion 120 to other panels of the first cushion portion 120 may also be used to join the second cushion portion 130 to the first cushion portion 120. For example, the second cushion portion 130 can be attached to the first cushion portion 120 by a perimeter seam (e.g., a perimeter stitch). In other embodiments, one or more seams that are separate from the perimeter seam may be used to join the first and second cushion portions 120, 130. For example, in some embodiments, a periphery of the second cushion portion 130 may be secured to a side panel of the first cushion portion 120 via stitching at a position internal to the periphery of a side panel of the first cushion portion 120. In still other embodiments, the first and second cushion portions 120, 130 may be formed of a unitary piece of material.

In other embodiments, the second cushion portion 130 may be joined to the first cushion portion 120 by a fill tube 140, which will be discussed in greater detail below. In still other embodiments, the second cushion portion 130 may be unattached or unconnected and separate from the first cushion portion 120, although the second cushion portion 130 may abut against the first cushion portion 120. In other words, panels of the second cushion portion 130 may not be coupled to panels of the first cushion portion 120.

In the illustrated embodiment, the second cushion portion 130 is smaller than the first cushion portion 120. In other embodiments, the second cushion portion 130 may be sized and/or shaped differently. For example, the second inflatable chamber 132 may have a similar volume to a volume of the first inflatable chamber 122. The second cushion portion 130 may extend further toward the occupant 60 than the embodiment shown in FIG. 1A. The second cushion portion 130 may even possibly extend toward the occupant 60 to a similar or greater measure than the first cushion portion 120. The second cushion portion 130 may extend higher than shown in FIG. 1A, and possibly even higher than the first cushion portion 120. The second cushion portion 130 may extend lower than shown in FIG. 1A, and possibly even lower than the first cushion portion 120. The second cushion portion 130 may extend further forward toward a front of the vehicle 50 than shown in FIG. 1A, and possibly even more forward than the first cushion portion 120, for example, to conform to the dashboard 70 of the vehicle 50. The second cushion portion 130 may be larger than the first cushion portion 120.

When the airbag cushion 110 is fully deployed, the first cushion portion 120 can be positioned directly in front of the occupant 60 and the second cushion portion 130 can extend laterally, in an inboard direction, from the first cushion portion 120. For example, in some embodiments, the second cushion portion 130 may be configured to cover the IP stack region 71 (see FIG. 2A) of the dashboard 70.

In the illustrated embodiment, the first cushion portion 120 defines a first inflatable chamber 122 that is configured to receive inflation gas from the inflator 112. The first cushion portion 120 can thereby inflate and expand from a compact state to a deployed state. In certain embodiments, the first cushion portion 120 may include or define a throat region configured to couple to the inflator 112. In certain embodiments, the first cushion portion 120 may be connected to the second cushion portion 130 in any suitable manner, such as via one or more seams (e.g., one or more lines of stitching, welds, and/or adhesives), as noted. In certain other embodiments, the first cushion portion 120 may be separate and distinct (e.g., uncoupled) from the second cushion portion 130.

The second cushion portion 130 defines a second inflatable chamber 132 that is also configured to receive inflation gas, such as from the inflator 112 and/or from the first inflatable chamber 122 via a fill tube 140 or other similar conduit. Stated otherwise, the second inflatable chamber 132 may be in fluid communication with the inflator 112 and/or the first inflatable chamber 122, via a fill tube 140 (or similar conduit) so that the second inflatable chamber 132 receives inflation gas to inflate and expand the second cushion portion 132.

The fill tube 140 may be in fluid communication with the inflator 112 such that the second inflatable chamber 132 may be said to receive inflation gas directly from the inflator 112 or indirectly from the inflator 112 via the first inflatable chamber 122. In certain embodiments, the fill tube 140 may be coupled to the inflator 112 such that the fill tube 140 and, in turn, the second inflatable chamber 132 receive inflation gas directly from the inflator 112. In certain other embodiments, the fill tube 140 may be coupled to the first cushion portion 120 and in fluid communication with the first inflatable chamber 122, such as via an aperture defined in a panel of the first cushion portion 120. The fill tube 140 receives inflation gas and channels or directs the inflation gas to the second inflatable chamber 132. The second cushion portion 130 can thereby inflate and expand from a compact state to a deployed state.

The fill tube 140 may be configured to be closed by expansion of the first cushion portion 120 as the first inflatable chamber 122 inflates. In the embodiment of FIG. 1A, the fill tube 140 may, in a deployed state, be disposed forward of a front panel 124 of the first cushion portion 120, between a portion of the front panel 124 and a portion of the dashboard 70, such that expansion of the first cushion portion 120 during inflation presses the fill tube 140 against the dashboard 70 to close the fill tube 140. The fill tube 140 may be disposed, at deployment, between the first cushion portion 120 and any component or portion of the vehicle 50 in which the airbag assembly 100 may be mounted, such that the fully inflated (or nearly fully inflated) first cushion portion 120 would cause pressure on a wall of the fill tube 140 to pinch the fill tube 140 between the first cushion portion 120 and the vehicle 50 (e.g., the dashboard 70, or the windshield 52) to close the fill tube 140. In this manner, the fill tube 140 may function as a pinch valve that regulates or controls flow of air into the second inflatable chamber 132.

In the embodiment of FIG. 1A, the fill tube 140 is a conduit formed on or at an outer surface of the first cushion portion 120. The fill tube 140 may be formed by an additional panel of material that is stitched or otherwise coupled to a front panel 124 of the first cushion portion 120 and that is coupled to or integral with a panel of the second cushion portion 130. As such, a first wall of the fill tube 140 may be the front panel 124 of the first cushion portion 120 and a second wall of the fill tube 140 may be a fill tube panel 142 coupled to the front panel 124 of the first cushion portion 120. The fill tube panel 142 may be of the same or similar material as the front panel 124 and/or other panels of the first cushion portion 120. The fill tube panel 142 may be of the same or similar material as one or more panels of the second cushion portion 130. In other embodiments, the fill tube 140 may be formed by dedicated panels that are distinct from panels of the first cushion portion 120. In still other embodiments, the fill tube 140 may be a hose or similar tubular structure.

The fill tube 140, as noted above, is in fluid communication with the inflator 112, either through direct attachment at or to the inflator 112 or indirectly via the first inflatable chamber 122. As inflation gas is released from the inflator 112, the fill tube 140 is filled with inflation gas as shown in FIG. 1A. The fill tube 140 may expand, as shown in FIG. 1A. The fill tube 140 receives inflation gas and channels or directs the inflation gas to the second inflatable chamber 132.

Figure 1B:
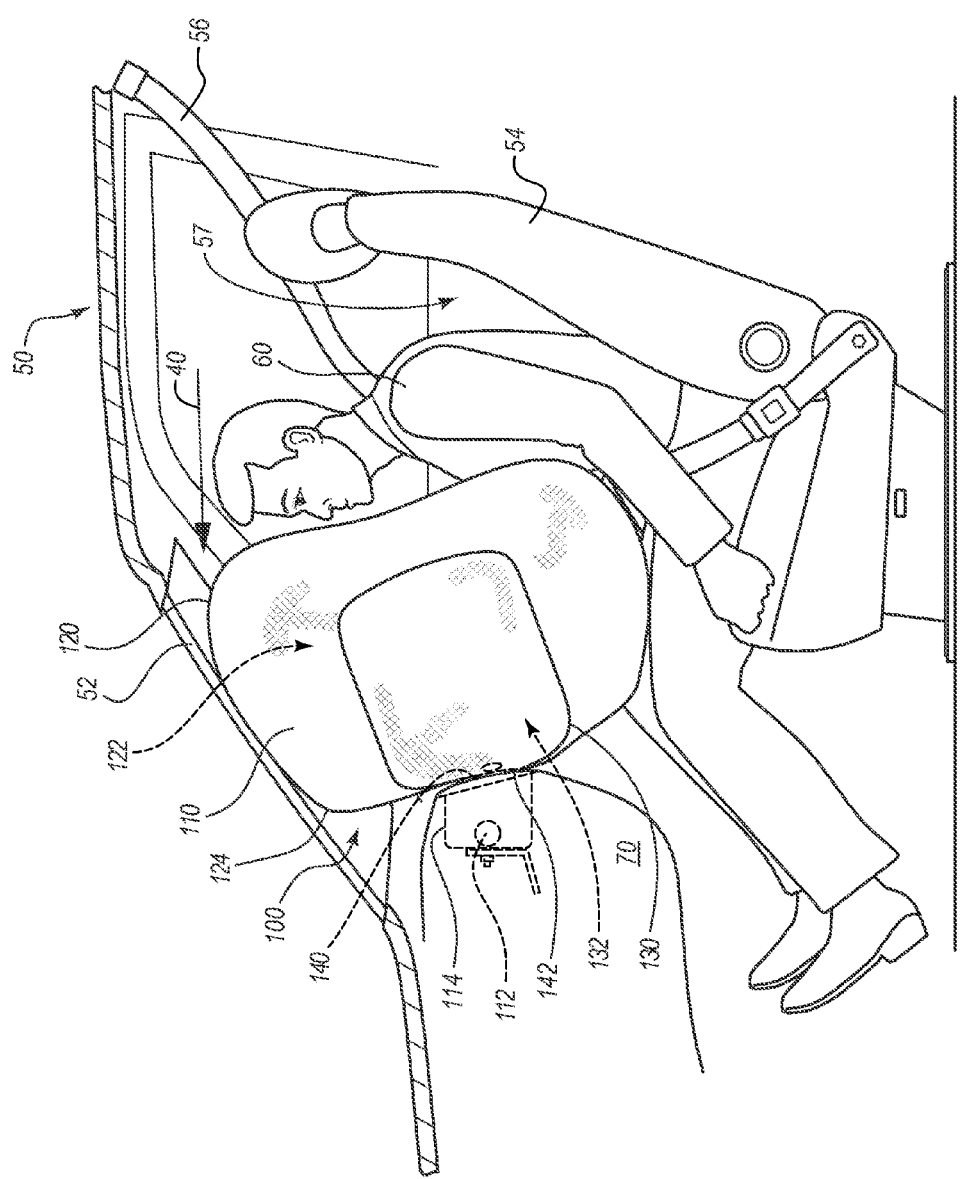
FIG. 1B is a side elevation view of the airbag assembly of FIG. 1 in a further deployed state. The fill tube extending from the primary cushion to the supplemental cushion is pinched closed by the inflated primary cushion.

As shown in FIG. 1B, expansion of the first cushion portion 120 due to inflation of the first inflatable chamber 122 by release of inflation gases from the inflator 112 eventually causes the fill tube 140 to close. The fill tube 140 may be disposed, at initial deployment (prior to or at or near a beginning of inflation), between the first cushion portion 120 and a component or portion of the vehicle 50 (in which the airbag assembly 100 may be mounted). In FIG. 1B, the fill tube 140 is disposed between the front panel 124 of the first cushion portion 120 and the dashboard 70 of the vehicle 50. The fully inflated (or nearly fully inflated) first cushion portion 120 is expanded to a point to cause pressure on a wall of the fill tube 140. The pressure on the fill tube 140 pinches the fill tube 140 between the first cushion portion 120 and the vehicle 50 (e.g., the dashboard 70) to close the fill tube 140. Closure of the fill tube 140 limits or prevents flow of inflation gas through the fill tube 140, either into or out of the second cushion portion 130. In this manner, inflation gas can be retained in the second inflatable chamber 132 to receive the occupant 60 and provide appropriate ride down during a collision event.

With reference to FIGS. 1A and 1B, the illustrated airbag assembly 100 is deployed to receive the vehicle occupant 60. The occupant 60 is shown seated in a seat 54 configured to accommodate a single person (e.g., a bucket seat). The seat 54 may provide a well-defined vehicle occupant region 57, which may also be referred to herein as a vehicle occupant position, within which the vehicle occupant 60 is generally positioned while in the seat 54. As previously mentioned, the first cushion portion 120 can be configured to deploy directly in front of the vehicle occupant region 57 and/or toward the vehicle occupant region 57. Stated otherwise, in some instances, the deployment of the first cushion portion 120 may follow a trajectory that is not in a straight line toward the vehicle occupant region 57, such as by expanding upwardly toward a windshield 52 of the vehicle 50 and/or downwardly toward a floor of the vehicle 50. However, a general deployment of the first cushion portion 120 may nevertheless be generally rearward toward the vehicle occupant region 57.

In operation, the airbag assembly 100 can be deployed when the vehicle 50 is involved in a collision. The first cushion portion 120 can deploy in a direction toward the vehicle occupant 60 in any suitable manner. For example, the first cushion portion 120 can deploy generally as a typical passenger airbag, which does not include a supplemental chamber, might deploy. In the illustrated embodiment, the second cushion portion 130 receives inflation gas from a first cushion portion 120 to inflate, expand, and extend from the first cushion portion 120 laterally toward the driver's side of the vehicle 50. The fill tube 140 may provide fluid communication between the first inflatable chamber 122 and the second inflatable chamber 132. Accordingly, as the first inflatable chamber 122 inflates, the fill tube 140 also directs at least a portion of inflation gas within the first inflatable chamber 122 into the second inflatable chamber 132. Expansion of the first cushion portion 120 as the first inflatable chamber 122 inflates gradually or eventually pinches the fill tube 140 closed against the dashboard 70.

In some instances, when the vehicle 50 is involved in a collision that causes the occupant 60 to move primarily or substantially exclusively in a forward direction toward the dashboard 70, the first cushion portion 120 may receive the vehicle occupant 60 in a typical fashion. The forward direction is depicted by the arrow 40. The forward direction 40 may be a forward direction of travel of the vehicle 50. In other instances, the vehicle 50 can be involved in a collision that causes the occupant 60 to move in both the forward direction 40 and an inboard direction (e.g., toward the center of the vehicle 50 or toward the driver side of the vehicle 50, in an oblique direction relative to the forward direction). The second cushion portion 130 can provide an additional cushioning region for the occupant 60 in such instances. For example, in some circumstances, the occupant 60 may miss the first cushion portion 120 but may be received by the second cushion portion 130. In other or further circumstances, the first cushion portion 120 may roll as the occupant 60 engages an inboard corner thereof, such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled (oblique) forward/inboard direction.

Figure 2A:
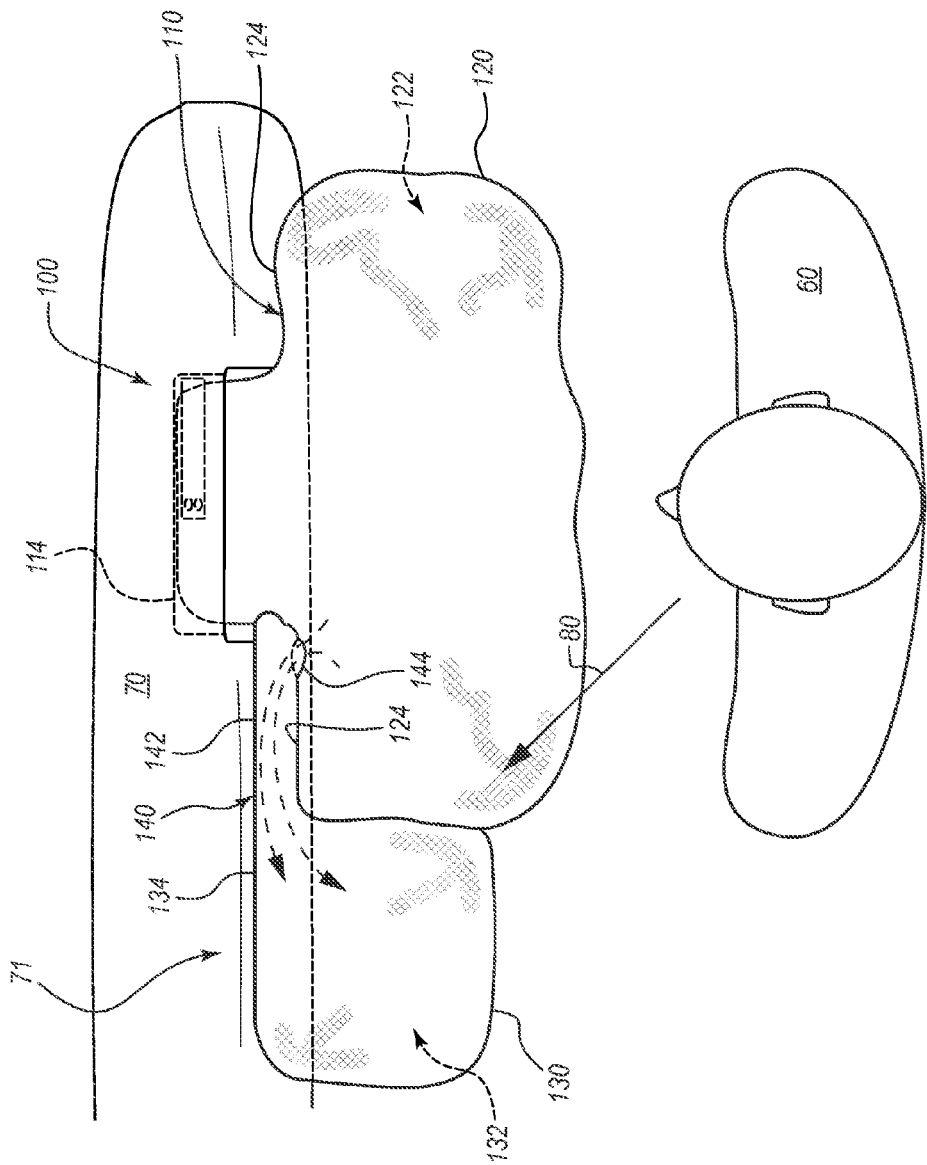
FIG. 2A is a top plan view of the airbag assembly of FIGS. 1A and 1B deployed in a different collision event, in which the vehicle occupant is depicted moving toward the deployed airbag assembly in an oblique direction relative to a direction of travel of the vehicle. The fill tube extending from the primary cushion to the supplemental cushion is open.

FIG. 2A is a top plan view of the airbag assembly 100 of FIGS. 1A and 1B at least partially deployed (e.g., partially inflated) in a collision event that causes the torso of the vehicle occupant 60 to travel toward the deployed airbag assembly 100 in an angled forward/inboard direction. The angled direction, which may also be referred to as an oblique direction, is depicted by the arrow 80. In the illustrated embodiment of FIG. 2A, the first cushion portion 120 deploys from the instrument panel 70 in a first direction toward an occupant 60 seated in front of the airbag housing 114. In this manner, the first cushion portion 120 is prepared to receive the occupant 60, and would do so in a typical fashion if the vehicle occupant 60 were to move primarily in the forward direction 40 (i.e., toward the front of the vehicle 50), such as depicted in FIGS. 1A and 1B. However, the angled movement of the occupant 60 may prevent the occupant 60 from adequately engaging with the first cushion portion 120.

In FIG. 2A, the first cushion portion 120 is partially inflated and the fill tube 140 is in an open state or configuration. As shown in FIG. 2A, the fill tube 140 or conduit is formed by the fill tube panel 142 which is coupled to or integral with a front panel 134 of the second cushion portion 130. The fill tube panel 142 also couples to or is integral with a front panel 124 of the first cushion portion 120. The fill tube 142 receives inflation gas through an aperture 144 in the front panel 124 of the first cushion portion 120. The aperture 144 is in fluid communication with the internal chamber 122 of the first cushion portion 120. The fill tube 142 directs the inflation gas received through the aperture 144 to the second inflatable chamber 132 of the second cushion portion 130.

As shown in FIG. 2A, the deployed second cushion portion 130 extends laterally from a first cushion portion 120 toward the driver's side of the vehicle 50 (see FIGS. 1A and 1B). A front face or front panel 134 of the second cushion portion 130 can be positioned adjacent to the dashboard 70 when the second cushion portion 130 is inflated. Such an orientation of the second cushion portion 130 can assist in stabilizing the first cushion portion 120. In other or further arrangements, such an orientation can permit the second cushion portion 130 to readily receive the occupant 60 if the occupant 60 bypasses or is not fully stopped by the first cushion portion 120. The second cushion portion 130 may thus shield the occupant 60 from harmful contact with the dashboard 70, and in some instances, may be oriented in such a manner to shield the occupant 60 from harmful contact with the IP stack region 71 of the dashboard 70.

In the illustrated embodiment, the IP stack region 71 is illustrated as being substantially flush with adjacent outboard portions of the dashboard 70. Similarly, the front panel 134 of the second cushion portion 130 may be substantially flush with the IP stack region 71 of the dashboard 70. In other embodiments, the IP stack region 71 may project rearwardly within the cabin of the vehicle 50. In certain of such embodiments, the rear face of the second cushion portion 130 may be positioned rearwardly (e.g., toward a rearward end of the vehicle 50) relative to a rear face of the first cushion portion 120.

The deployed second cushion portion 130 can receive the vehicle occupant 60 if the occupant 60 misses the first cushion portion 120. In other or further circumstances, the first cushion portion 120 may roll as the occupant 60 engages an inboard corner thereof such that the occupant 60 does not fully engage the first cushion portion 120 and may then be received by the second cushion portion 130. In still other or further circumstances, the second cushion portion 130 may stabilize the first cushion portion 120 to make the first cushion portion 120 resistant to rolling or otherwise missing the occupant 60 as the occupant 60 travels in an angled forward/inboard direction 80.

Figure 2B:
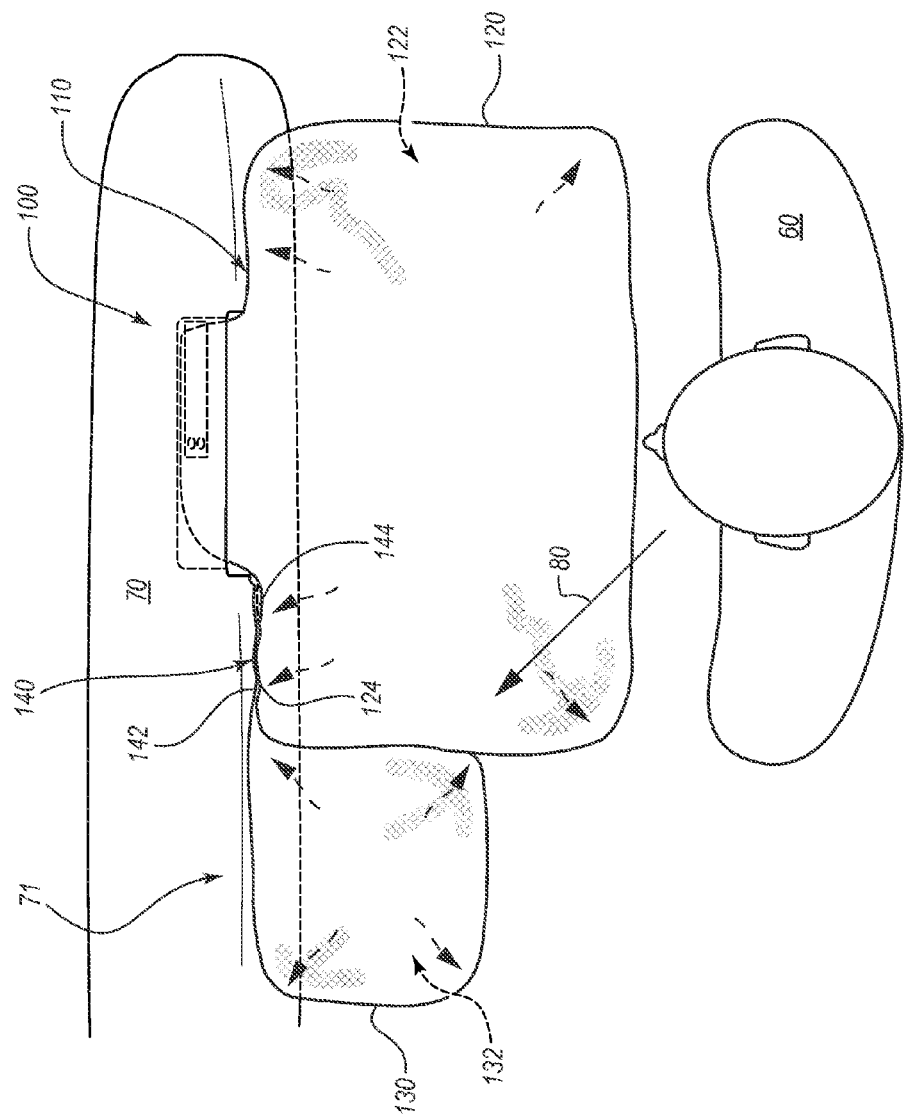
FIG. 2B is a top plan view of the airbag assembly of FIGS. 1A and 1B in a further deployed state in the different collision event of FIG. 2A. The fill tube extending from the primary cushion to the supplemental cushion is closed.

FIG. 2B is a top plan view of the airbag assembly 100 of FIGS. 1A and 1B in a further deployed state in the different collision event of FIG. 2A. The collision causes the torso of the vehicle occupant 60 to travel toward the deployed airbag assembly 100 in an angled forward/inboard direction indicated by arrow 80. The fill tube 140 extending from the first cushion portion 120 to the second cushion portion 130 is closed. Expansion of the first cushion portion 120 due to inflation of the first inflatable chamber 122 causes the front panel 124 of the first cushion portion 120 to press against the fill tube panel 142 and/or the dashboard 70 to pinch the fill tube 140 closed. The closed fill tube 140 ensures that inflation gas in the second inflatable chamber 132 does not travel back through the fill tube 140 from the second inflatable chamber 132 to the first inflatable chamber 122. The pinched fill tube 140 restricts the flow of inflation gas from the second inflatable chamber 132 back through the fill tube 140.

Figure 2C:
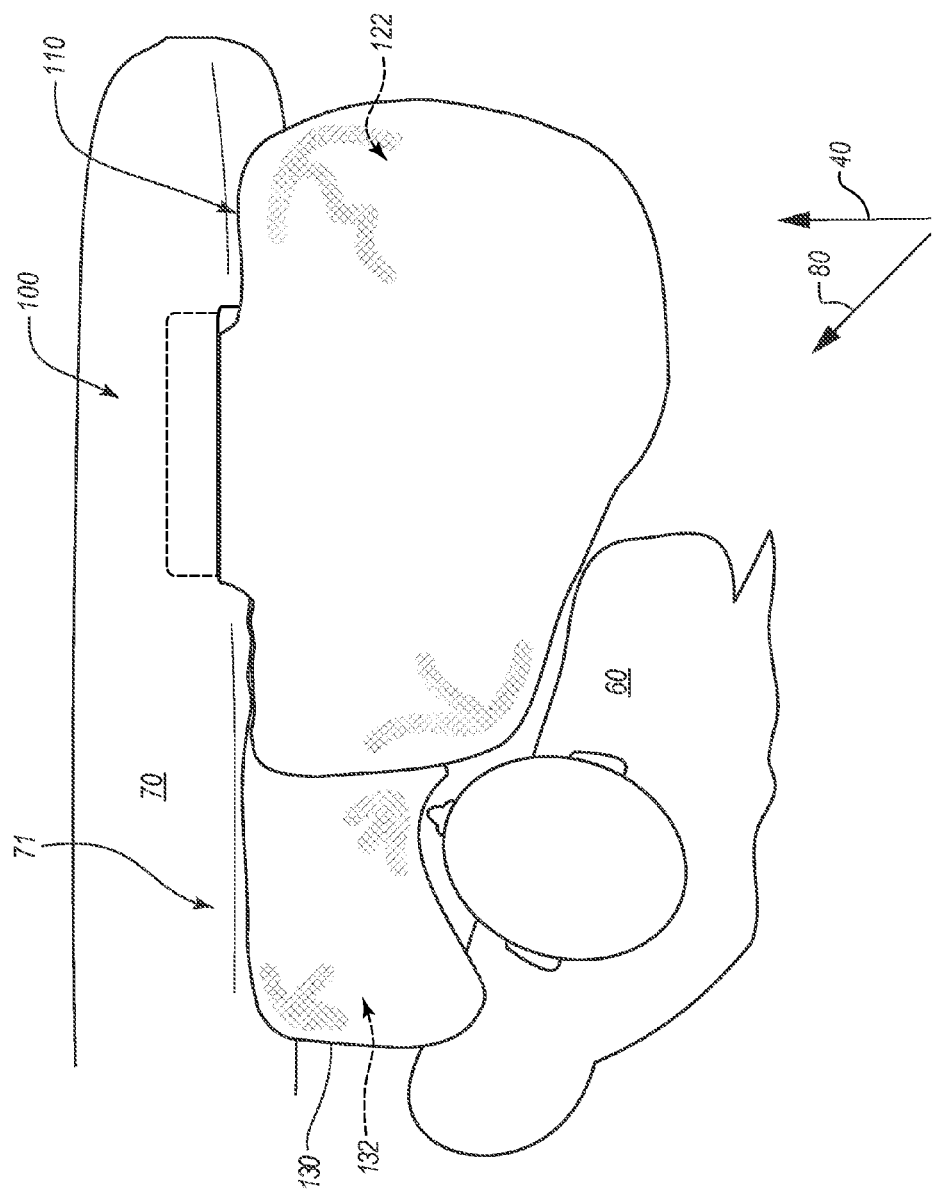
FIG. 2C is a top plan view of the airbag assembly of FIGS. 1A and 1B that depicts a subsequent position of the vehicle occupant, as compared to FIG. 2B, in which the multi-chambered airbag cushions the vehicle occupant.

FIG. 2C is a top plan view of the airbag assembly 100 of FIGS. 1A and 1B that depicts a subsequent position of the vehicle occupant 60, as compared to FIG. 2B, in which the multi-chambered airbag 110 cushions the vehicle occupant 60. FIG. 2C depicts the vehicle occupant 60 at a later stage of travel in the angled forward/inboard direction 80 at interaction with the deployed airbag assembly 100. In the illustrated embodiment, the torso of the occupant 60 has only partially engaged with the first cushion portion 120, while another portion of the torso has either deflected off of or bypassed the first cushion portion 120 to engage the second cushion portion 130, due to the movement of the occupant 60 in the oblique direction 80 (i.e., oblique relative to the forward direction 40). The head of the occupant 60 is also shown being received by the second cushion portion 130. In some instances, when the occupant 60 contacts an inboard region of the first cushion portion 120, it may cause the head of the occupant 60 to rotate in an outboard direction (e.g., toward the passenger door). The second cushion portion 130 may reduce or prevent such rotational movement, which might otherwise result in or contribute to kinematic rotational brain injury. In some instances, an effectiveness of the airbag cushion 110 at reducing such brain injury can be sensitive to a position at which the head of the occupant 60 originally contacts the airbag cushion 110. The configuration of the second cushion portion 130 may be determined in view of this relationship, in some instances.

In some collision scenarios, the shoulder restraint portion of the seatbelt 56 (see FIGS. 1A and 1B) may slip off of the shoulder (e.g., the right shoulder) of the occupant 60 due to the oblique movement of the occupant 60. With little or no restraint provided by the seatbelt 56 to inhibit movement of the torso of the occupant 60 along an oblique trajectory, it may be particularly desirable for the airbag cushion 110 to be configured to cushion the occupant 60, or the portion thereof, that bypasses the first cushion portion 120 to prevent hard contact of the occupant 60 with the instrument panel 70 and/or IP stack region 71.

In the illustrated embodiment, the head and left shoulder of the occupant 60 are protected from harmful contact with the dashboard 70 by the second cushion portion 130. In other instances, the second cushion portion 130 may protect other body portions of the occupant 60 due to the nature of the collision; the size, shape, and/or initial position of the occupant 60; the configuration of the second cushion portion 130; etc. In some embodiments, the second cushion portion 130 is configured to primarily cushion the head of the vehicle occupant 60.

In some embodiments, it may be desirable for the head of the occupant 60 to "pocket" within the second cushion portion 130. For example, in the illustrated embodiment, the head of the occupant 60 is shown within a depression of the second cushion portion 130, which may also be referred to as a pocket. Such an arrangement may stabilize the head of the occupant 60 during ride down and/or may reduce rotational velocities of the head of the occupant 60. Such a reduction in rotational velocities of the head of the occupant 60 may advantageously reduce the risk of brain injury.

In some instances, differently sized occupants may interact with the airbag 110 differently when the vehicle 50 (see FIGS. 1A and 1B) undergoes identical collision events. For example, in some instances, an occupant 60 who is larger than the occupant depicted may be received almost exclusively via the first cushion portion 120. For example, the head and torso of the larger occupant 60 may be received by the first cushion portion 120. In such circumstances, the second cushion portion 130 may nevertheless assist in stabilizing the first cushion portion 120 and in preventing the occupant 60 from slipping off of the first cushion portion 120 or missing the first cushion portion 120 due to bouncing or other instability of the first cushion portion 120.

The airbag assembly shown in FIGS. 1A, 1B, 2A, 2B, and 2C, like other embodiments disclosed herein, may protect an occupant 60 (and, in particular, the occupant's head) from contact with hard surfaces, including, for example, the instrument panel (including the IP stack region 71 of the dashboard 70). In other embodiments, the second cushion portion 130 may be attached to the first cushion portion 120 at other positions to prevent contact with other portions of the vehicle 50. For example, in other or further embodiments, a second cushion portion 130 may be positioned at an outboard side of the first cushion portion 120. Such a location of the second cushion portion 130 may assist in preventing harmful contact with the windshield 52, an A-pillar, and/or portions of a door of the vehicle 50, such as when the vehicle occupant 60 is moved in an oblique direction that is both in a forward direction and an outboard direction. In other or further embodiments, one or more second cushion portions 130 may be positioned at a bottom end of the first cushion portion 120 to shield the knees of the occupant 60. In other or further embodiments, one or more second cushion portions 130 may be positioned at a top end of the first cushion portion 120. Any suitable number and/or combination of secondary cushion portions 130 that extend from the primary cushion portion 120 are contemplated.

Figure 3A:
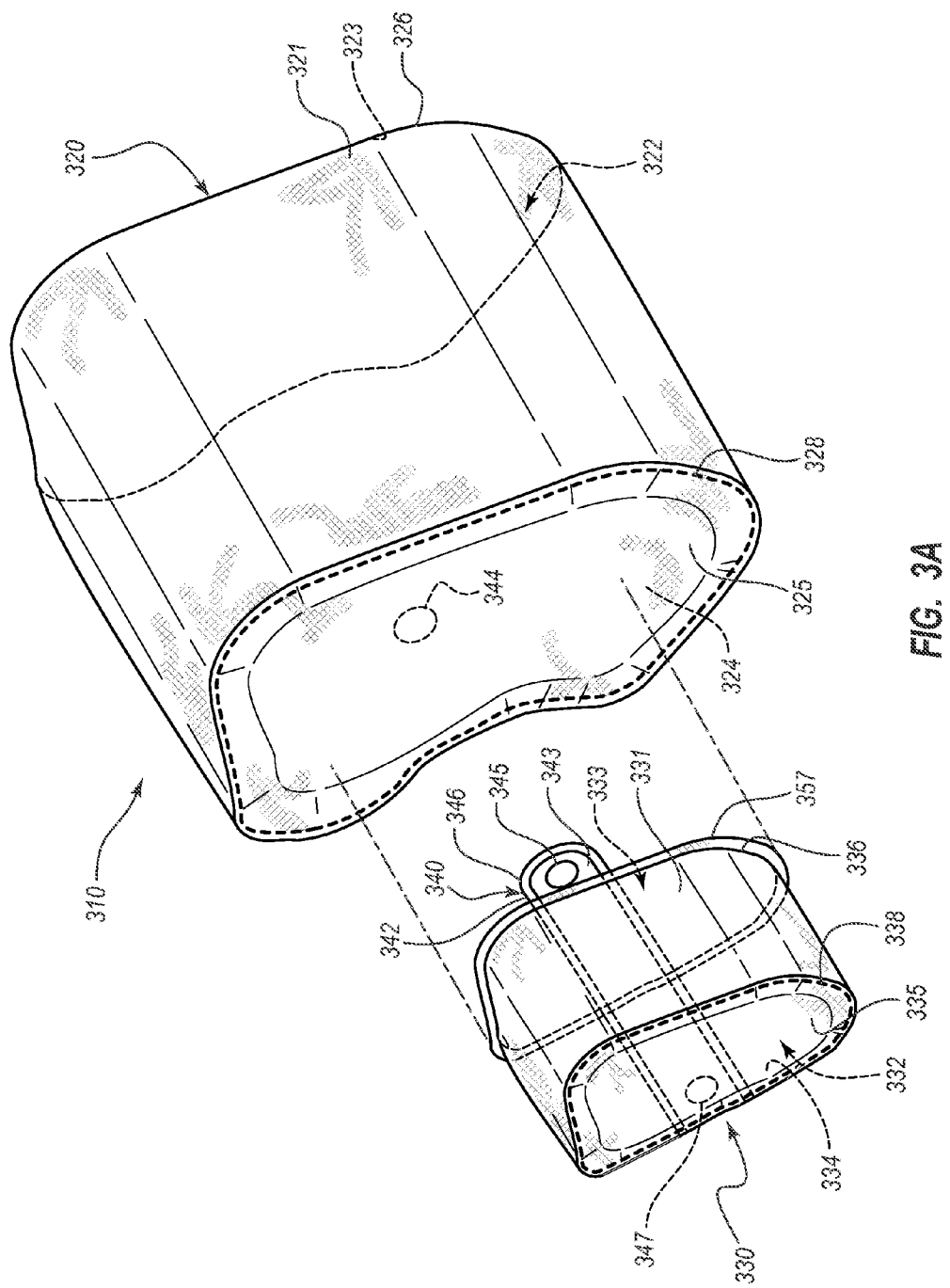
FIG. 3A is an exploded perspective view of a multi-chamber airbag of an airbag assembly, according to another embodiment, with a primary cushion and a supplemental cushion both shown in an expanded state. A fill tube to provide fluid communication between the pair of inflatable chambers is shown.

FIG. 3A is an exploded perspective view of a multi-chamber airbag 310 of an airbag assembly, with a primary cushion 320 (or first cushion portion) and a supplemental cushion 330 (or second cushion portion) both shown in an expanded state. A fill tube 340 is also included to provide fluid communication between a primary inflatable chamber 322 and a supplemental inflatable chamber 332. The airbag 310 of FIG. 3A can resemble the airbag 110 described above in certain respects. Accordingly, like features are designated with like reference numerals, with the leading digits incremented to "3." Relevant disclosure set forth above regarding similarly identified features thus may not be repeated hereafter. Moreover, specific features of the airbag 310 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag 310. Any suitable combination of the features and variations of the same described with respect to the airbag 110 can be employed with the airbag 310, and vice versa. Similarly, the airbag 310 can be used with any suitable airbag assembly, including the airbag assembly 100 discussed above. This pattern of disclosure applies equally to further embodiments depicted in subsequent figures and described hereafter, wherein the leading digits may be further incremented.

The exploded view of FIG. 3A illustrates an embodiment in which the first cushion portion 320 can be connected with the second cushion portion 330. The first cushion portion 320 includes a rear panel 321, a first side panel 323, a front panel 324, and a second side panel 325. The first side panel 323 is joined to the rear panel 321 and front panel 324 by a seam 326, and the second side panel 325 is joined to the rear panel 321 and front panel 324 by a seam 328. The seams 326 and 328 may be of any suitable variety, whether sealed or unsealed seams, and may be formed via stitching, one or more adhesives, taping, welding (e.g., radio frequency welding), heat sealing, or any other suitable technique or combination of techniques. The panels 321, 323, 324, 325 may be formed of any suitable material. For example, in some embodiments, panels are formed of woven nylon fabric. Moreover, a variety of types and configurations of airbag panels can be utilized in various embodiments. For example, the size, shape, proportions, number, and connectivity of the panels may vary in different embodiments. Some embodiments may be tailored for use in different vehicles and/or for different locations within a vehicle.

The second cushion portion 330 includes a rear panel 331, a first side panel 333, a front panel 334, and a second side panel 335. The first side panel 333 is joined to the rear panel 331 and front panel 334 by a seam 336, and the second side panel 335 is joined to the rear panel 331 and front panel 334 by a seam 338. The seams 336, 338 may be of any suitable variety, whether sealed or unsealed seams, and may be formed via stitching, one or more adhesives, taping, welding (e.g., radio frequency welding), heat sealing, or any other suitable technique or combination of techniques. The panels 331, 333, 334, 335 may be formed of any suitable material. For example, in some embodiments, panels are formed of woven nylon fabric. Moreover, a variety of types and configurations of airbag panels can be utilized in various embodiments. For example, the size, shape, proportions, number, and connectivity of the panels may vary in different embodiments. Some embodiments may be tailored for use in different vehicles and/or for different locations within a vehicle.

In the illustrated airbag 310, the second cushion portion 330 may be attached to the side panel 325 of the first cushion portion 320 in any suitable manner. In certain embodiments, the second cushion portion 330 may not include the side panel 333 and a portion of the side panel 325 may separate the first inflatable chamber 322 from the second inflatable chamber 332 and thus may be referred to as a partition. In the illustrated embodiment, the second cushion portion 330 is attached via a seam 357. The size and position of the seam 357 can be such that the seam 357 is substantially circumscribed by the perimeter seam 328. Stated otherwise, the seam 357 can be spaced from the perimeter seam 328 such that the periphery of the second cushion portion 330 is secured to the side panel 325 of the first cushion portion 320 via the stitching at a position internal to the periphery of the first cushion portion 320. In other embodiments, at least a portion of the second cushion portion 330 may be joined to the first cushion portion 320 via the perimeter seam 328.

The fill tube 340 may include a fill tube front panel 342, a fill tube back panel 343, an aperture 345 formed in the fill tube rear panel 343 to be in fluid communication with the first inflatable chamber 322 of the first cushion portion 320, and an aperture 347 in fluid communication with the second inflatable chamber 332 of the second cushion portion 330. The fill tube front panel 342 and fill tube back panel 343 may be coupled together along a seam 346 to form a tube or conduit to allow inflation gas to be directed. As noted above, other configurations of fill tubes or conduits for directing air to the second inflatable chamber 332 are possible.

Upon the inflation pressurization in the first cushion portion 320 rising, inflation gases may begin venting from the first inflatable chamber 322 through the aperture 344 in the front panel 324 of the first cushion portion 320 and through the aperture 345 in the fill tube rear panel 343, into the fill tube 340, through the aperture 347 in the fill tube rear panel 343, and into to the second inflatable chamber 332.

Figure 3B:
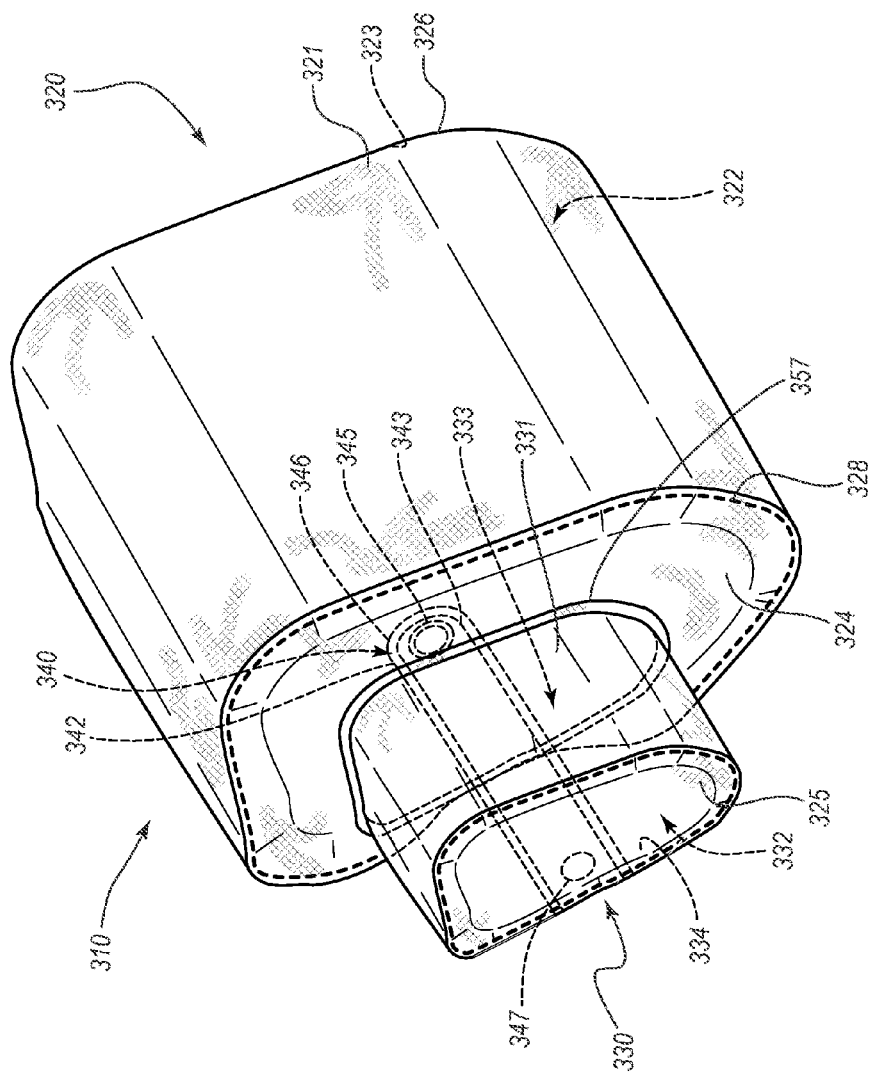
FIG. 3B is a perspective view of the multi-chamber airbag of FIG. 3A in an assembled state with the primary cushion and the supplemental cushion in an expanded state.

FIG. 3B is a perspective view of the multi-chamber airbag 310 in an assembled state with the primary cushion 320 and the supplemental cushion 330 in an expanded state. FIG. 3B illustrates alignment of aperture 344 in the front panel 324 of the first cushion portion 320 and aperture 345 in the fill tube rear panel 343.

As illustrated in FIGS. 3A and 3B, the second cushion portion 330 may be configured to extend a distance from the first cushion portion 320 when the airbag 310 is fully inflated. The distance may be selected based on any suitable criteria, such as a width of the first cushion portion 320, or width of the IP stack region 71 (see FIG. 2A). Other dimensions of the second cushion portion 330 may also be selected to permit suitable coverage of potentially injurious portions of the vehicle 50, such as the IP stack region 71 or other portions of the dashboard 70 (see FIG. 2A).

The deployed first cushion portion 320 can define a volume $V_1$, which may be at least partially defined by interior surfaces of the first cushion portion 320. The deployed second cushion portion 330 can define a volume $V_2$ that is at least partially defined by the interior surfaces of the second cushion portion 330. In some embodiments, the first and second cushion portions 320, 330 may be configured to fill simultaneously, although one may fill more rapidly than the other. In many embodiments, the volume $V_1$ is greater than the volume $V_2$.

Figure 4:
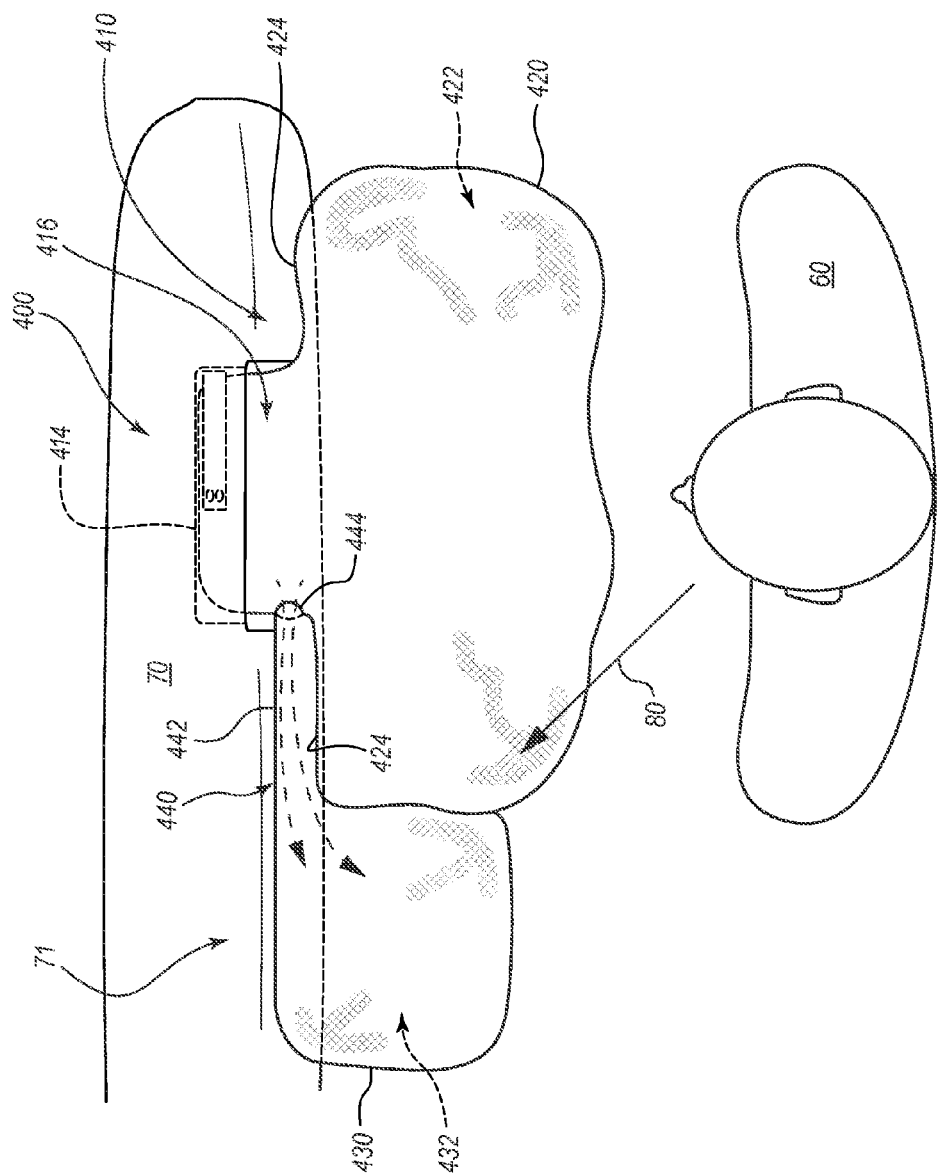
FIG. 4 is a top plan view of an airbag assembly, according to another embodiment, in a partially deployed state with a fill tube in an open configuration.

FIG. 4 is a top plan view of an airbag assembly 400, according to another embodiment, in a partially deployed state (e.g., at least partially inflated) with a fill tube 440 in an open configuration. The airbag assembly 400 includes an airbag 410, an inflator 412, and a housing 414, similar to embodiments described above. The airbag 410 includes a first cushion portion 420 forming a first inflatable chamber 422, a second cushion portion 430 forming a second inflatable chamber 432, and a fill tube 440 in fluid communication with the second inflatable chamber 432 and the inflator 412.

Similar to previously described embodiments, the fill tube 440 conveys inflation gas released by the inflator 412 to the second inflatable chamber 432. In the airbag 410 of FIG. 4, the fill tube 440 includes a fill tube front panel 442 that couples to a throat region 416 of the first cushion portion 420. The throat region 416 is coupled to the inflator 412 and conveys inflation gas from the inflator 412 into the first inflatable chamber 422. An aperture 444 in the throat portion 416 allows fluid communication of the fill tube 440 with the inflator 412. Like the previously described embodiments, the fill tube 440 is configured to be disposed between the first cushion portion 420 and a portion of the vehicle 50, such as the dashboard 70. As such, the fill tube 440 may be configured to be closed by expansion of the first cushion portion 420 as the first inflatable chamber 422 inflates. In the embodiment of FIG. 4, the fill tube 440 may, in a deployed state, be disposed forward of a front panel 424 of the first cushion portion 420, between a portion of the front panel 424 and a portion of the dashboard 70. Expansion of the first cushion portion 420 during inflation presses the fill tube 440 against the dashboard 70 to close the fill tube 440.

Figure 5:
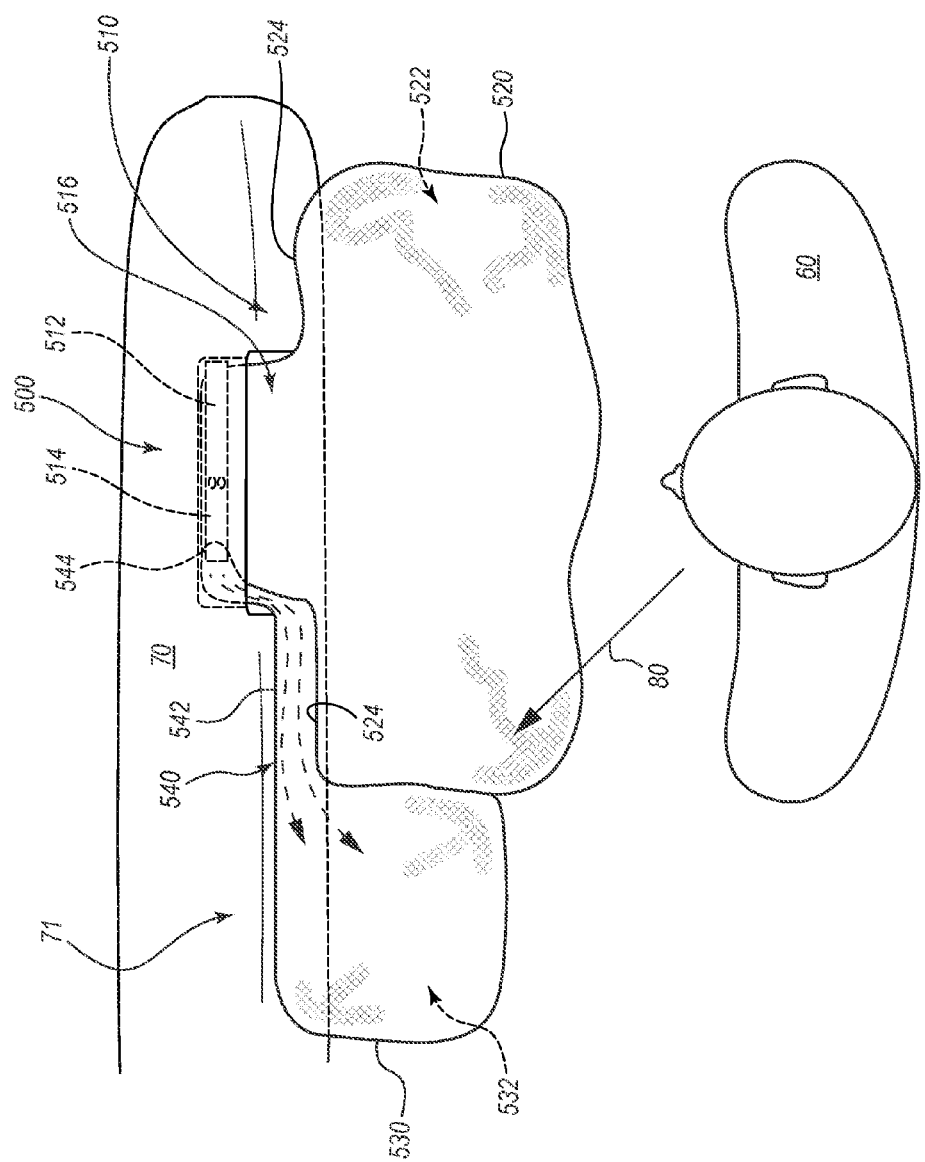
FIG. 5 is a top plan view of an airbag assembly, according to still another embodiment, in a partially deployed state with a fill tube in an open configuration.

FIG. 5 is a top plan view of an airbag assembly 500, according to still another embodiment, in a partially deployed state with a fill tube 540 in an open configuration. The airbag assembly 500 includes an airbag 510, an inflator 512, and a housing 514, similar to embodiments described above. The airbag 510 includes a first cushion portion 520 forming a first inflatable chamber 522, a second cushion portion 530 forming a second inflatable chamber 532, and a fill tube 540 in fluid communication with the second inflatable chamber 532 and the inflator 512. In the embodiment of FIG. 5, the fill tube 540 is directly coupled to, and in direct fluid communication with, the inflator 512. The fill tube 540 includes a fill tube front panel 542 that couples to the inflator 512.

Similar to previously described embodiments, the fill tube 540 conveys inflation gas released by the inflator 512 to the second inflatable chamber 532. The fill tube 540 is configured to be disposed between the first cushion portion 520 and a portion of the vehicle 50, such as the dashboard 70. As such, the fill tube 540 may be configured to be closed by expansion of the first cushion portion 520 as the first inflatable chamber 522 inflates. In the embodiment of FIG. 5, the fill tube 540 may, in a deployed state, be disposed forward of a front panel 524 of the first cushion portion 520, between a portion of the front panel 524 and a portion of the dashboard 70. Expansion of the first cushion portion 520 during inflation presses the fill tube 540 against the dashboard 70 to close the fill tube 540.

In the foregoing embodiments, the fill tube is shown and described as being disposed between a first cushion portion and a dashboard of the vehicle. As can be appreciated, other embodiments are contemplated. The fill tube may be disposed between any suitable portion of the vehicle and the first cushion portion. For example, in one embodiment, the fill tube may be disposed on an upper or top surface of a main cushion portion to be positioned between the main cushion portion and a windshield of the vehicle.

Much of the foregoing disclosure has focused on passenger airbags. It should be understood that airbag features disclosed herein may be used with other types of airbags, as previously mentioned. For example, in some embodiments, driver airbags can include primary and secondary chambers such as disclosed herein.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

We claim:

1. An airbag assembly comprising:
   a housing configured to be mounted in a dashboard of a vehicle at a first position;
   an inflator; and
   an airbag coupled to the inflator to receive inflation gas to expand from a compact state to a deployed state, the airbag comprising:
      a first inflatable cushion portion configured to deploy from the housing and, in the deployed state when the housing is mounted in the dashboard of the vehicle at the first position, to cover a first portion of the dashboard to receive a torso of a vehicle occupant moving from a vehicle occupant position primarily in a forward direction relative to the vehicle, wherein the first cushion portion is a primary cushion configured to deploy from the housing in a first direction toward the vehicle occupant position;
      a second inflatable cushion portion configured to deploy from the housing and, in the deployed state when the housing is mounted in the dashboard of the vehicle at the first position, to cover a second portion of the dashboard that is laterally spaced from the first portion of the dashboard; wherein the second cushion portion is a supplemental cushion configured to expand away from the first cushion portion in a second direction, wherein the second cushion portion is configured to receive a head of the vehicle occupant when the vehicle occupant moves from the vehicle occupant position in a direction that is oblique relative to the forward direction and includes a component in the second direction; and a fill tube in fluid communication with the second inflatable cushion portion that when open permits flow of inflation gas generated by the inflator to the second inflatable cushion portion, wherein the fill tube is configured to be closed by expansion of the first inflatable cushion portion as the first inflatable cushion portion inflates.

2. The airbag assembly of claim 1, wherein the second direction is lateral relative to the first direction.

3. The airbag assembly of claim 1, wherein the fill tube, in the deployed state, is disposed forward of a front panel of the first cushion portion, between a portion of the front panel and a portion of the dashboard, such that expansion of the first cushion portion during inflation presses the fill tube against the dashboard to close the fill tube.

4. The airbag assembly of claim 1, wherein the fill tube, in the deployed state, is disposed on an upper surface of the first cushion portion, between the first cushion portion and a windshield of the vehicle, such that expansion of the first cushion portion during inflation presses the fill tube against the windshield to close the fill tube.

5. The airbag assembly of claim 1, wherein the fill tube, in the deployed state, is disposed between a portion of a panel of the first inflatable cushion and another portion of the vehicle, such that expansion of the first inflatable cushion portion during inflation pinches the fill tube against the another portion of the vehicle to close the fill tube.

6. The airbag assembly of claim 1, wherein the fill tube provides fluid communication between the first inflatable cushion portion and the second inflatable cushion portion, such that inflation gas flows from the inflator, to the first inflatable cushion portion, through the fill tube, and into the second inflatable cushion portion.

7. The airbag assembly of claim 1, wherein the fill tube couples to a front panel of the first inflatable cushion portion in fluid communication with an inflatable chamber of the first inflatable cushion portion at an aperture in the front panel.

8. The airbag assembly of claim 1, wherein a first end of the fill tube is coupled to the inflator and a second end of the fill tube is coupled to the second inflatable cushion portion to provide fluid communication directly between the inflator and the second inflatable cushion portion.

9. The airbag assembly of claim 1, wherein the first inflatable cushion portion comprises a throat configured to couple to the inflator to receive inflation gas from the inflator, wherein the fill tube is in fluid communication with the throat of the first inflatable cushion portion.

10. An airbag assembly comprising:
a housing configured to be mounted in a vehicle at a first position;
an inflator; and
an airbag cushion that comprises:
a first cushion portion that defines a first inflatable chamber that is configured to receive inflation gas from the inflator to expand the first cushion portion from a compact state to a deployed state, wherein the first cushion portion is configured to deploy from the housing, and wherein the first cushion portion is configured to receive a torso of a vehicle occupant when the vehicle occupant moves from a vehicle occupant position primarily in a forward direction relative to the vehicle, wherein the first cushion portion is configured to deploy from the housing in a first direction toward the vehicle occupant position;

a second cushion portion connected to the first cushion portion, wherein the second cushion portion defines a second inflatable chamber that is configured to receive inflation gas from the first inflatable chamber to expand the second cushion portion from a compact state to a deployed state to cover a region of the vehicle that is at a second position, wherein the second position is spaced laterally from the first position, wherein the second cushion portion is configured to expand away from the first cushion portion in a second direction, wherein the second cushion portion is configured to receive a head of the vehicle occupant when the vehicle occupant moves from the vehicle occupant position in a direction that is oblique relative to the forward direction and includes a component in the second direction; and a conduit in fluid communication with the second inflatable chamber to permit flow of inflation gas into the second inflatable chamber, wherein the conduit is configured to be closed by expansion of the first cushion portion as the first inflatable chamber inflates.

11. The airbag assembly of claim 10, wherein the conduit, upon deployment of the airbag assembly, is configured to be disposed between a portion of the first inflatable cushion and a portion of a vehicle in which the airbag assembly is mounted, such that expansion of the first cushion portion during inflation pinches the conduit closed against the portion of the vehicle.

12. The airbag assembly of claim 10, wherein the conduit provides fluid communication between the first inflatable chamber and the second inflatable chamber, such that inflation gas generated by the inflator flows from the first inflatable chamber through the conduit and into the second inflatable chamber.

13. The airbag assembly of claim 10, wherein the conduit, when closed, restricts flow of inflation gas from the second inflatable chamber to the first inflatable chamber, to isolate inflation gases in the second inflatable chamber from the inflation gases in the first inflatable chamber.

14. The airbag assembly of claim 10, wherein a first end of the conduit is coupled to the inflator to provide fluid communication directly between the inflator and the second inflatable chamber.

15. An airbag comprising:
a first cushion portion that defines a first inflatable chamber that is configured to receive inflation gas from an inflator to expand the first cushion portion from a compact state to a deployed state;
a second cushion portion that defines a second inflatable chamber that is configured to receive inflation gas generated by the inflator to expand the second cushion portion from a compact state to a deployed state; and
a conduit in fluid communication with the second inflatable chamber that, when open, permits inflation gas to flow into the second inflatable chamber and that is configured to be closed by expansion of the first cushion portion as the first inflatable chamber inflates;
wherein the conduit is disposed outside the first inflatable chamber of the first cushion portion at a position where, upon deployment of the airbag, the conduit is between a portion of the first inflatable cushion and a portion of a vehicle in which the airbag is utilized, such that expansion of the first cushion portion during inflation causes pressure on the conduit against the portion of the vehicle to close the conduit.

16. The airbag of claim 15, wherein the first cushion portion comprises a front panel defining an aperture in fluid communication with the first inflatable chamber;

wherein the conduit is coupled to the front panel of the first cushion portion in fluid communication with the first inflatable chamber via the aperture defined in the front panel such that expansion of the first cushion portion during inflation pinches the conduit between the first cushion portion and a dashboard of the vehicle to close the conduit.

17. The airbag of claim 15, wherein the conduit is configured to couple in direct fluid communication with an inflator that is configured to inflate the airbag.

* * * * *